E. S. BECK.
COMBINED CHECK AND STOP VALVE.
APPLICATION FILED JULY 24, 1911.
1,019,590.
Patented Mar. 5, 1912.
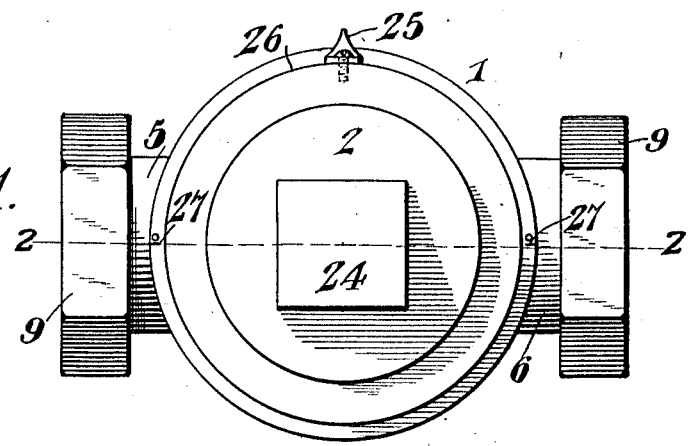
Fig. 1.
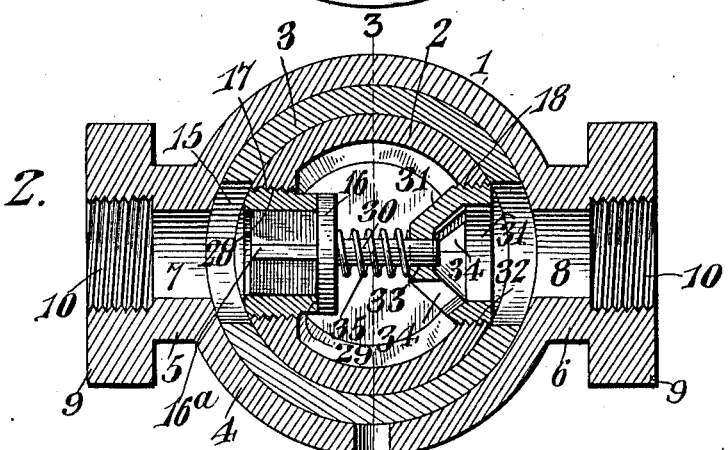
Fig. 2.
Fig. 3.
Edwin S. Beck,
Inventor
Witnesses
Attorney

UNITED STATES PATENT OFFICE.

EDWIN S. BECK, OF DUNCANNON, PENNSYLVANIA.

COMBINED CHECK AND STOP VALVE.

1,019,590.  Specification of Letters Patent.  Patented Mar. 5, 1912.

Application filed July 24, 1911. Serial No. 640,277.

*To all whom it may concern:*

Be it known that I, EDWIN S. BECK, a citizen of the United States, residing at Duncannon, in the county of Perry and State of Pennsylvania, have invented a new and useful Combined Check and Stop Valve, of which the following is a specification.

The invention relates to a combined check and stop valve.

The object of the present invention is to improve the construction of check valves, and to provide a simple, efficient and comparatively inexpensive check valve, capable of reversal to arrange either end of the valve at the pressure side and to permit water or other fluid to flow in either direction.

A further object of the invention is to provide a check valve of this character, adapted to operate as a stop valve or cock, and also equipped with means for permitting water or other liquid under pressure to be cut off for enabling the check valve, the valve seat and the spring for actuating the same to be removed and repaired or replaced by a new part without breaking any of the pipe connections.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a front elevation of a combined check and stop valve, constructed in accordance with this invention. Fig. 2 is a longitudinal sectional view on the line 2—2 of Fig. 1. Fig. 3 is a similar view on the line 3—3 of Fig. 2.

Like numerals of reference designate corresponding parts in all the figures of the drawing.

In the accompanying drawing in which is illustrated the preferred embodiment of the invention, the combined check and stop valve comprises in its construction an outer valve casing 1, an inner valve plug 2, and an intermediate cut-off sleeve 3, having a bearing in the valve casing and forming a bearing or seat for the valve plug 2. The valve casing consists of a tapered annular body portion 4, having opposite tubular extensions 5 and 6, forming openings or passages 7 and 8, which are arranged diametrically opposite each other. The tubular extensions 5 and 6 of the body are provided with polygonal wrench receiving flanges 9, and are interiorly threaded at 10 to receive the threaded ends of pipes, tubes, or other conduits.

The rotary cut-off sleeve, which is tapered, fits within the tapered annular body portion 4 of the valve casing, and it is open at its larger end to receive the valve plug 2, and it is provided at its smaller end with a wall 11, and it has exterior threads 12 at the said smaller end to receive a nut 13. The nut 13, which bears against a washer 14, is adapted to hold the sleeve in tight contact with the valve casing, and is capable of taking up wear and of preventing leakage between the sleeve and the casing. The washer 14 is interposed between the nut and the smaller end of the tapered annular body portion of the valve casing. The cut-off sleeve is provided at diametrically opposite points in the plane of the passages of the valve casing with openings 15, which are normally arranged in register with the openings or passages 7 and 8 of the valve casing, but the cut-off sleeve is adapted to be rotated one quarter of a revolution to carry opposite imperforate portions to the openings or passages 7 and 8 to close the same and cut off the flow of water or other fluid, when it is desired to remove the valve plug for the purpose of repairing or renewing its check valve 16, or any of the co-acting parts.

The valve plug 2, which is hollow, is provided at diametrically opposite points with openings 17 and 18, which are located in the same transverse plane as the openings or passages of the rotary cut-off sleeve and the valve casing, and the valve plug 2 has a threaded stem or screw 19, extending outwardly from its inner smaller end 20. The threaded stem or screw 19 extends through an opening 21 in the end wall 11, and it receives a nut 22, which is adapted to tighten the valve plug and maintain the proper frictional contact between the same and the cut-off sleeve 3. A washer 23 is interposed between the nut 22 and the end wall 11. The outer end of the valve plug is provided with an integral wrench receiving portion 24, which may be of square or any other polygonal shape to permit the valve plug to be readily turned by a wrench or other tool. The cut-off sleeve may be turned by any suitable means, and it is preferably provided with an indicating finger or pointer 25, secured to a peripheral flange 26 of the cut-off sleeve, and adapted to indicate the position of the openings of the cut-off sleeve, suitable marks 27 being preferably provided on the valve casing to coöperate with the pointer or indicator for designating the open and closed positions of the same The valve plug 2 is preferably enlarged interiorly at the opening 17 and is provided thereat with screw threads to receive a threaded portion 28 of a tubular valve seat 29, screwed into the threaded opening 17 and projecting into the valve plug and receiving the check valve 16. The check valve 16 is in the form of a disk, and it is provided with a valve stem 30, which operates in a guide 31. The guide 31, which is tapered or conical, has a cylindrical exteriorly threaded portion 32, which screws into the opening 18 of the valve plug. The opening 18 has interior screw threads, and the guide 31, which is hollow, projects into the valve plug and is provided with a central opening 33 for guiding the valve stem 30. It is also provided with a plurality of openings 34, spaced from and arranged around the central opening for the passage of water or other fluid. The valve is also guided by wings 16ª formed integral with the disk of the check valve 16 and extending into the tubular valve seat, as clearly illustrated in Fig. 2 of the drawing. The wings may be either three or four in number as desired, and they coöperate with the stem and the guide in centering the valve. A coiled spring 35, which is disposed on the valve stem, is interposed between the guide and the check valve for holding the latter normally seated. The threading of the tubular valve seat and the hollow conical guide enables the valve seat, the valve and the guide to be readily removed for repair, or to enable a worn or broken part to be replaced by a new piece.

The check valve is disposed transversely of the valve plug in the plane of the openings or passages of the valve casing, the rotary cut-off sleeve and the valve plug, and the latter is adjustable to arrange the valve seat at either side of the valve to permit a flow of water, or other fluid in either direction. The check valve will work in any position, and when employed in connection with injectors for feeding water to boilers, the check valve may be reversed to cause the boiler pressure to blow back and clear the injectors of any obstructions. The flow of water or other fluid pressure may be cut off by a quarter turn of either the cut-off sleeve or the valve plug, and should it become necessary to repair the check valve, the cut-off sleeve may be employed to close the openings of the valve casing. This will permit such repairs to be made without breaking any of the pipe connections.

Having thus fully described my invention, what I claim as new and desire to secure by Letters Patent, is:—

1. A valve of the class described including a valve casing having opposite openings or passages arranged in the same transverse plane, a rotary cut-off sleeve mounted within the casing and provided with opposite openings or passages arranged to register with the openings or passages of the casing, a valve plug mounted for rotary adjustment within the cut-off sleeve and provided with opposite openings and having a valve seat at one of the said openings, the openings of the valve plug being arranged to register with the openings or passages of the cut-off sleeve and the valve casing, the valve plug and the cut-off sleeve being provided between their openings or passages with imperforate portions arranged to cover, respectively, the openings or passages of the cut-off sleeve and the openings or passages of the valve casing, and a check valve disposed transversely of the valve plug and operating in the plane of the said openings or passages and coöperating with the said valve seat and adapted to be reversed by the rotary movement of the valve plug.

2. A valve of the class described comprising a valve casing having opposite openings, a rotary cut-off sleeve mounted for rotary movement in the valve casing and having opposite openings adapted to be moved into and out of register with the openings of the valve casing, a valve plug mounted for rotary movement in the cut-off sleeve and having opposite openings, a guide arranged at one of the openings of the valve plug, a tubular valve seat detachably secured in the other opening of the valve plug and extending into the same, and a transversely disposed check valve co-acting with the tubular valve seat and having a stem slidable in the guide.

3. A valve of the class described comprising a valve casing having opposite openings, a rotary cut-off sleeve mounted for rotary movement in the valve casing and having opposite openings adapted to be moved into and out of register with the openings of the valve casing, a valve plug mounted for rotary movement in the cut-off sleeve and having opposite openings and provided at one of the openings with a valve seat, and a tapered hollow guide detachably secured in the other opening of the valve plug and projecting into the latter and provided at its apex with a guide opening and having an opening located at one side of the guide opening and forming a passage for water or other fluid, and a check valve co-acting with the valve seat and having a stem slidable in the said guide opening.

4. A valve of the class described comprising a valve casing having opposite openings, a rotary cut-off sleeve mounted for rotary movement in the valve casing and having opposite openings adapted to be moved into and out of register with the openings of the valve casing, a valve plug mounted for rotary movement in the cut-off sleeve and having opposite threaded openings, a tubular valve seat extending into the valve plug and having a threaded portion engaging the threads of one of the openings of the valve plug, a threaded guide detachably engaging the threads of the other opening of the valve plug and extending into the same and having a guide opening, and a valve co-acting with the tubular valve seat and provided with a stem slidable in the opening of the guide.

In testimony that I claim the foregoing as my own, I have hereto affixed my signature in the presence of two witnesses.

EDWIN S. BECK.

Witnesses:
 FRANK W. MUTZABAUGH,
 EDYTHE M. MADER.

---

Copies of this patent may be obtained for five cents each, by addressing the "Commissioner of Patents, Washington, D. C."